Oct. 30, 1934.   D. GREGG ET AL   1,978,863
AIRPLANE CONTROL
Filed Aug. 9, 1932
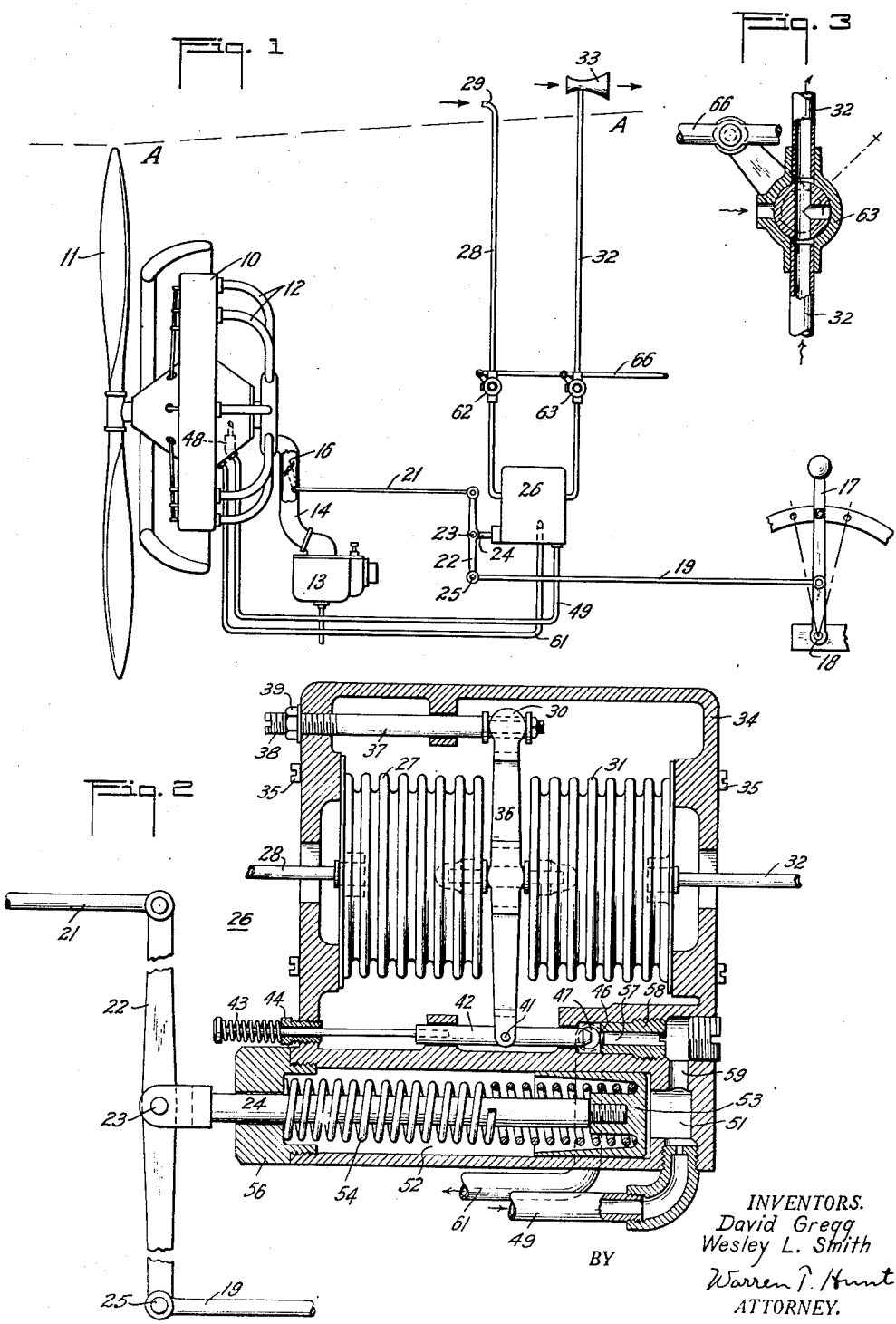
INVENTORS.
David Gregg
Wesley L. Smith
BY
Warren P. Hunt
ATTORNEY.

Patented Oct. 30, 1934

1,978,863

UNITED STATES PATENT OFFICE 1,978,863

AIRPLANE CONTROL

David Gregg, Caldwell, and Wesley L. Smith, Cranford, N. J., assignors, by mesne assignments, to Eclipse Aviation Corporation, East Orange, N. J., a corporation of New Jersey Application August 9, 1932, Serial No. 628,092

7 Claims. (Cl. 244—25)

This invention relates to airplane controls and more particularly to an automatic control for an airplane.

A principal object of the invention is to prevent an airplane from stalling.

Another object of the invention is to provide a means for automatically increasing the plane speed when it approaches the stalling point.

Another object of the invention is to provide an airplane engine with a control that is actuated by a pressure-operated device in a manner to increase the speed of the engine and the speed of the airplane when the air speed has decreased to a predetermined minimum, for example, the stalling speed.

A novel feature of the invention relates to an expansible or collapsible device that is movable in accordance with the air speed of the plane and is inter-connected with an engine control such as the throttle valve. The air pressure actuated device is preferably connected to a Pitot tube, or a Venturi tube, or a combination of both. For illustrative purposes, both Pitot and Venturi tubes are shown which are connected to a pair of tandem arranged expansible bellows. The bellows are adapted to cooperate and move the engine control in the same direction and are inter-connected with the throttle in a manner to open the throttle when the air speed is reduced to the predetermined minimum.

Other novel features including the arrangement of parts, means for disconnecting the controls, and a servo-motor, will be apparent from the following description in connection with which a preferred embodiment of the invention has been illustrated in the accompanying drawing in which:

Fig. 1 is a somewhat diagrammatic view of an airplane engine illustrating the arrangement of the improved speed control;

Fig. 2 is an enlarged sectional view of the control device showing the expansible bellows and the inter-connected servo-motor; and Fig. 3 is an enlarged view of a three-way shut off valve which is included in the conduit connecting each tube with one of the expansible members.

It is well known that airplanes have a certain minimum speed below which they are not self-supporting and which speed is ordinarily termed the stalling speed. Experienced flyers always keep their planes above the stalling speed except when landing but this involves a considerable amount of attention from the pilot, and the present invention is intended to maintain at all times, the speed of the plane above the stalling point except when landing or taking off.

In the drawing, 10 is an airplane engine to which is connected a propeller 11 and having intake manifolds 12 to which is connected a carburetor 13. Within the manifold 14 is a throttle valve 16 adapted to control the speed of the engine and the speed of the plane upon which the engine is installed. Throttle valve 16 is controlled by a manually operated member 17 pivotally connected at 18 to some fixed point of the plane and inter-connected with the throttle by means of rods 19 and 21 and lever 22. The intermediate point 23 of lever 22 is pivotally connected to the operating rod 24 of a device 26 which is adapted to move lever 22 in a manner to open the throttle 16 as the speed of the airplane approaches its stalling point. It may be seen that operation of lever 17 (from its intermediate position as shown in Fig. 1), in a counter-clockwise direction will open the throttle by rotating lever 22 about pivotal point 23, and also that a movement of rod 24 toward the left, as viewed in Fig. 1, will close the throttle 16 by rotating lever 22 about pivotal point 25.

The device 26 includes an expansible bellows 27 which is connected through a conduit 28 to a Pitot tube 29 preferably directed in the line of flight of the airplane. A second expansible bellows 31 is connected through conduit 32 to a Venturi tube 33 which is also directed in the line of flight of the airplane and has its neck portion in communication with the conduit 32. Bellows 27 and 31 are attached to casing 34 by any desired means such as screws 35 and have their adjacent inner end portions arranged on opposite sides of a lever 36 that has its top portion in the form of a bifurcated ball joint 30 coacting with a rod 37 adjustable in casing 34 by means of threaded portion 38, a check nut 39 being provided for securing it in the desired position. The lower end of lever 36 is pivotally connected at 41 to a valve member 42 which is provided with a spring 43 and an adjusting screw 44. Valve 42 is adapted to coact with a valve seat 46 to close relief port 47 at some predetermined movement of lever 36 toward the right.

An engine driven pump 48 at all times tends to force oil or other liquid through conduit 49 to compartment 51 which is open to cylinder 52 and piston 53 which is normally pressed toward the right by a spring 54 that abuts the threaded plug 56. Chamber 51 is also connected with conduit 57 of the plug 58 by means of passageway 59, and when valve 42 is off its seat, as shown in Fig. 2, the liquid will normally circulate from the pump through conduit 49 to opening 47 and back through conduit 61 to the crankcase of the engine 10. The pressure of the air acting on Pitot tube 29 will cause the inner end of expansible bellows 27 to move toward the right, which action will be assisted by a corresponding collapse of bellows 31 which is produced by the suction from the air flow through Venturi tube 33. Movement of lever 36 toward the right will close the relief port 47 and cause the pressure in chamber 51 to force piston 53 toward the left and partially close throttle 16 which closure can, if desired, be offset by a further movement of lever 17 in a counter-clockwise direction. Both Pitot tube 29 and Venturi tube 33 are preferably located outside of the slip stream of the propeller 11, the direction of which is indicated by the broken line A—A, and which arrangement causes the expansible bellows 27 and 31 to be affected by air speed only, irrespective of the velocity of the propeller slip stream.

Although valves 62 and 63 may, if desired, be of the ordinary type, it is preferred to employ three-way valves in each of the conduits 28 and 32 whereby when the valves are moved to the position whereby the tubes are disconnected from the expansible bellows, that atmospheric air will be admitted to each of the bellows and counteract any pressure or vacuum which has existed therein prior to the movement of the valve.

In the operation of the device, each of the valves 62 and 63 is moved to the position shown in Fig. 3 wherein both the Pitot tube and the Venturi tube are connected to their respective bellows. So long as the air speed of the plane is great enough to move valve 42 to its seated position, piston 53 will assume a position toward the left of the position shown in Fig. 2 and the throttle valve 16 will be partially closed, that is, assuming that control lever 17 has been placed in a position whereby the throttle valve 16 will be in its full open position when piston 53 has moved its full distance toward the right. The partially closed position of throttle 16 will be maintained for cruising conditions of the airplane and there will be no tendency for it to assume a different position until the air speed has fallen to somewhere near the stalling point, at which time the pressure within bellows 27 will be decreased and the absolute pressure within bellows 31 will be increased. Spring 43 will then move valve 42 to the position shown in Fig. 2 wherein the pressure on the piston 53 will be relieved and it will move toward the right and cause throttle 16 to assume its full open position.

It will be apparent from the above description that the control is automatic in its operation and will increase the throttle opening whenever the stalling speed is approached and that the operator may also change position of the throttle valve 16 by movement of the control lever 17 independently of the position of the pressure actuated device. Valves 62 and 63 are ordinarily left in the position shown in Fig. 3, but during landing and taking off it is desirable for the operator to have a complete manual control of the engine throttle valve and under these conditions, valves 62 and 63 may be moved to a position whereby the Pitot and Venturi tubes are disconnected and atmospheric air pressure imposed on the bellows.

It will be apparent that although the use of a servo-motor, such as that shown, is desirable, under some conditions the use of the servo-motor may be dispensed with and the lower end of lever 36 may be connected to lever 22 in a manner to open the throttle when the air pressure is decreased beyond a predetermined minimum. Although a preferred embodiment of the invention has been illustrated and described, it is understood that various changes may be made without departing from the scope of the invention and that it is not regarded as limited to the form shown and described or otherwise except for the terms of the following claims.

What is claimed is:

1. In an airplane having an engine, a throttle therefor, a pair of collapsible members one of which is expansible in accordance with air speed, the other of which is collapsible in accordance with air speed, a fluid pressure actuated device controlled by the joint action of both members to close the throttle when the pressure is applied to the device, spring means for opening the throttle, and an engine driven pump for supplying fluid pressure to the device.

2. In an airplane having an engine, a control therefor, a pair of collapsible members one of which is expansible in accordance with air speed, the other of which is collapsible in accordance with air speed, a fluid pressure actuated device controlled by the joint action of both members to operate the control and increase the engine speed when the air speed is reduced, means for controlling the device to move the engine control to increase engine speed when the fluid pressure is reduced, and an engine driven pump for supplying fluid pressure to the device.

3. In an airplane having an engine, a control therefor, manual means for operating the control, and means operable in accordance with the combined influence of the air speed of the plane and the speed of the engine adapted to vary the effect of the manual control means.

4. In an airplane having an engine, a throttle therefor, manual means for operating the throttle and means operable in accordance with the combined influence of the air speed of the plane and the speed of the engine adapted to open the throttle when either the air speed or the engine speed is reduced.

5. In an airplane having an engine and a throttle valve therefor, means for controlling the throttle in accordance with the combined influence of the air speed of the airplane and the speed of the engine including a pivoted lever having two movable fulcrums connected to the engine throttle, a manual control for the throttle including means for varying the position of one fulcrum, and said other fulcrum being movable by said first named means in accordance with the combined influence of air and engine speeds.

6. In an airplane having an engine, a throttle therefor, a diaphragm movable in accordance with air speed, a fluid pressure servo-motor for closing the throttle as the pressure is increased, spring means for opening the throttle, means for controlling the pressure supplied to the servo-motor by movement of the diaphragm, an engine driven pump for supplying pressure to the servo-motor in accordance with engine speed, and a linkage connecting the servo-motor with the engine throttle.

7. In an airplane having an engine, a throttle therefor, a diaphragm movable in accordance with air speed, a fluid pressure servo-motor for closing the throttle as the pressure is increased, spring means for opening the throttle, means for controlling the pressure supplied to servo-motor by movement of the diaphragm, an engine driven pump for supplying pressure to the servo-motor in accordance with engine speed, a linkage connecting the servo-motor with the engine throttle, a manually movable member, said linkage including a lever having its midportion pivotally connected to the servo-motor and its extremities connected to the engine control and manually movable member respectively.

DAVID GREGG.
WESLEY L. SMITH.